(12) United States Patent
Cheng

(10) Patent No.: US 12,282,197 B2
(45) Date of Patent: Apr. 22, 2025

(54) FIBER OPTIC ASSEMBLIES INCLUDING A BONDING AGENT, ALONG WITH RELATED METHODS

(71) Applicant: CORNING RESEARCH & DEVELOPMENT CORPORATION, Corning, NY (US)

(72) Inventor: Xiaole Cheng, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 353 days.

(21) Appl. No.: 17/867,766

(22) Filed: Jul. 19, 2022

(65) Prior Publication Data

US 2023/0049598 A1 Feb. 16, 2023

Related U.S. Application Data

(60) Provisional application No. 63/226,305, filed on Jul. 28, 2021.

(51) Int. Cl.
*B29D 11/00* (2006.01)
*G02B 6/38* (2006.01)

(52) U.S. Cl.
CPC ...... *G02B 6/3861* (2013.01); *B29D 11/00673* (2013.01)

(58) Field of Classification Search
CPC .............. G02B 6/3861; B29D 11/00673
See application file for complete search history.

(56) References Cited

U.S. PATENT DOCUMENTS

| 4,984,865 A * | 1/1991 | Lee ...................... G02B 6/3889 156/60 |
| 5,621,836 A | 4/1997 | Schofield et al. |
| 6,007,258 A * | 12/1999 | Marchitto ............ G02B 6/3807 385/60 |
| 2003/0081910 A1* | 5/2003 | Gimbel ................... G02B 6/25 385/80 |
| 2016/0041346 A1* | 2/2016 | Barnette, Jr. ........ G02B 6/3874 156/293 |
| 2020/0257061 A1* | 8/2020 | Holmquist ........... G02B 6/3802 |

FOREIGN PATENT DOCUMENTS

EP 0715194 A2 * 11/1995
WO WO-0022060 A1 * 4/2000 .............. C09J 11/06

* cited by examiner

*Primary Examiner* — Daniel McNally

(57) ABSTRACT

Generally, disclosed herein are various embodiments of bonding agents for use in adhering optical fibers to ferrules within optical connectors, and the methods for use thereof. The various embodiments of bonding agents described herein may provide desirable properties, such as, but not limited to, high adhesion strength and/or improved performance following environmental aging. Various embodiments of the bonding agents disclosed herein may also have other desirable properties for the process of securing an optical fiber within a ferrule, such as, but not limited to, shortened process cycle time.

12 Claims, 6 Drawing Sheets

FIBER OPTIC ASSEMBLIES INCLUDING A BONDING AGENT, ALONG WITH RELATED METHODS

PRIORITY APPLICATION

This application claims the benefit of priority of U.S. Provisional Application No. 63/226,305, filed on Jul. 28, 2021, the content of which is relied upon and incorporated herein by reference in its entirety.

FIELD OF THE DISCLOSURE

This disclosure relates generally to optical connectivity, and more particularly to fiber optic assemblies having a ferrule and bonding agent disposed in the ferrule, along with methods of making such assemblies and the bonding agents used therein.

BACKGROUND OF THE DISCLOSURE

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s), which are secured within a bore of the ferrule using a bonding agent (e.g., an adhesive). In particular, in the assembly of optical connectors, adhesives may be used to bond optical fibers to ferrules. The adhesives may typically be thermoset resins, such as epoxies. Present adhesives can require high temperature processing when assembling optical fiber connector assemblies which can in turn increase cycle time or damage other part of the optical fiber connector assemblies during the processing. As such, there is a need for a bonding agent with bonding properties and thermal properties that can result in suitable performance and cycle times for the optical fiber cable assemblies in which the bonding agent is present.

SUMMARY OF THE DISCLOSURE

Generally, disclosed herein are various embodiments of bonding agents for use in adhering optical fibers to ferrules within optical connectors, and the methods for use thereof. The various embodiments of bonding agents described herein may provide desirable properties, such as, but not limited to, high adhesion strength and/or improved performance following environmental aging. Various embodiments of the bonding agents disclosed herein may also have other desirable properties for the process of securing an optical fiber within a ferrule, such as, but not limited to, shortened process cycle time.

In one embodiment, a method of assembling an optical fiber assembly, wherein the optical fiber assembly includes a ferrule having a front end, a rear end, and a ferrule bore extending between the front and rear ends is provided. The method comprising: disposing a bonding agent into the ferrule; wherein the bonding agent has a viscosity ranging between 50 cP and 7000 cP; heating a front portion of the ferrule to at least 150° C. while the bonding agent is in the ferrule bore; inserting an optical fiber into the ferrule bore; wherein the heating step causes the bonding agent that is in the front portion of the ferrule to cure in less than 1 minute and thereby secure the optical fiber to the front portion of the ferrule.

In another embodiment, the bonding agent has a viscosity between 100 cP and 5000 cP. In another embodiment, the inserting step is simultaneous with the heating step. In another embodiment, the inserting step is completed before the heating step. In another embodiment, the heating step is completed in less than 10 seconds. In another embodiment, the disposing step comprises preloading the bonding agent into the ferrule bore prior to the heating and the inserting steps. In another embodiment, the ferrule is part of a ferrule assembly that includes a ferrule holder receiving a rear portion of the ferule, and wherein the disposing step comprises preloading the bonding agent in the ferrule holder adjacent the rear end of the ferrule. In another embodiment, the method further comprising: applying the bonding agent onto an external surface of the optical fiber, wherein the disposing step occurs when the optical fiber with the bonding agent applied to the external surface is inserted into the ferrule bore. In another embodiment, the optical fiber connector assembly has a mean insertion loss of less than or equal to 0.25 dB at a reference wavelength of 1310 nm. In another embodiment, the bonding agent comprises an anaerobic adhesive. In another embodiment, the bonding agent has a glass transition temperature above 70° C. In another embodiment, the optical fiber has a pull force of at least 10 N. In another embodiment, the heating step comprises heating an entire length of the ferrule. In another embodiment, the front portion of the ferrule comprises a length that is at least 20% of a total length of the ferrule bore. In another embodiment, during at least the heating step the ferrule is part of an optical connector assembly that includes a connector housing in which a rear portion of the ferrule is positioned, and wherein the front portion of the ferrule extends out of the connector housing.

In one embodiment, an optical fiber assembly is provided. The optical fiber assembly formed by: disposing a bonding agent in a ferrule bore of a ferrule, wherein the bonding agent has a viscosity ranging between 50 cP and 7000 cP; heating a front portion of the ferrule to at least 150° C. while the bonding agent is in the ferrule bore; and inserting an optical fiber into the ferrule bore; wherein the heating step causes the bonding agent that is in the front portion of the ferrule to cure in less than 1 minute and thereby secure the optical fiber to the front portion of the ferrule.

In another embodiment, the bonding agent has a viscosity between 100 cP and 5000 cP. In another embodiment, the inserting step is simultaneous with the heating step. In another embodiment, the inserting step is completed before the heating step. In another embodiment, the heating step is completed in less than 10 seconds. In another embodiment, the disposing step comprises preloading the bonding agent into the ferrule bore. In another embodiment, the disposing step comprises preloading the bonding agent adjacent a rear end of the ferrule. In another embodiment, the disposing step comprises applying the bonding agent onto an external surface of the optical fiber. In another embodiment, the optical fiber connector assembly has a mean insertion loss of less than or equal to 0.25 dB at a reference wavelength of 1310 nm. In another embodiment, the bonding agent comprises an anaerobic adhesive. In another embodiment, the bonding agent has a glass transition temperature above 70° C. In another embodiment, the optical fiber has a pull force of at least 10 N. In another embodiment, the front portion of the ferrule comprises a length of about 5 mm extending from a front end of the ferrule.

Additional features will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of optical connectivity will appreciate how features and attributes associated with embodiments shown in one of the drawings may be applied to embodiments shown in others of the drawings.

DETAILED DESCRIPTION

Various embodiments will be further clarified by examples in the description below. Generally, disclosed herein are various embodiments of bonding agents for use in adhering optical fibers to ferrules within optical connectors, and the methods for use thereof. The various embodiments of bonding agents described herein may provide desirable properties, such as, but not limited to, high adhesion strength and/or improved performance following environmental aging. Various embodiments of the bonding agents disclosed herein may also have other desirable properties for the process of securing an optical fiber within a ferrule, such as, but not limited to, shortened process cycle time.

The present disclosure also relates to optical fiber assemblies and methods of making the same. The optical fiber assemblies and methods may facilitate the cable assembly process for a fiber optic cable. That is, the optical fiber assemblies and methods may be initial steps to facilitate terminating one or more optical fibers from a fiber optic cable with a fiber optic connector to form a cable assembly.

In this disclosure, the term "optical fiber assembly" refers to an assembly that includes a ferrule secured to at least one optical fiber. Additional components may be included as part of the assembly, but are not necessarily required unless explicitly stated in the claims that follow this detailed description. Additionally, the terms "assembly" and "sub-assembly" are considered to be interchangeable as the context requires. That is, reference to an "assembly" does not preclude that assembly being used as a sub-assembly for another article or apparatus (e.g., as alluded to above, an optical fiber assembly may be a sub-assembly for a cable assembly).

Also in this disclosure, the term "fiber optic connector" refers to an assembly that includes a ferrule and a connector body, with the ferrule intended to facilitate the alignment of optical fibers for optical coupling, and with the connector body intended to facilitate mechanical coupling (e.g., to an adapter). Other components may be included as part of such an assembly, but are not necessarily required unless explicitly stated in the claims that follow this detailed description. The terms "connector assembly", "connector sub-assembly", "optical connector", and "connector" are considered to be interchangeable with "fiber optic connector" in this disclosure.

Also in this disclosure, the term "curing time" refers to the time it takes from the initiation of curing reaction for the curable adhesive composition to achieve about 80% of its ultimate load capacity or strength under substantially dry conditions, with ambient temperature at about 25° C.

Figure 1:
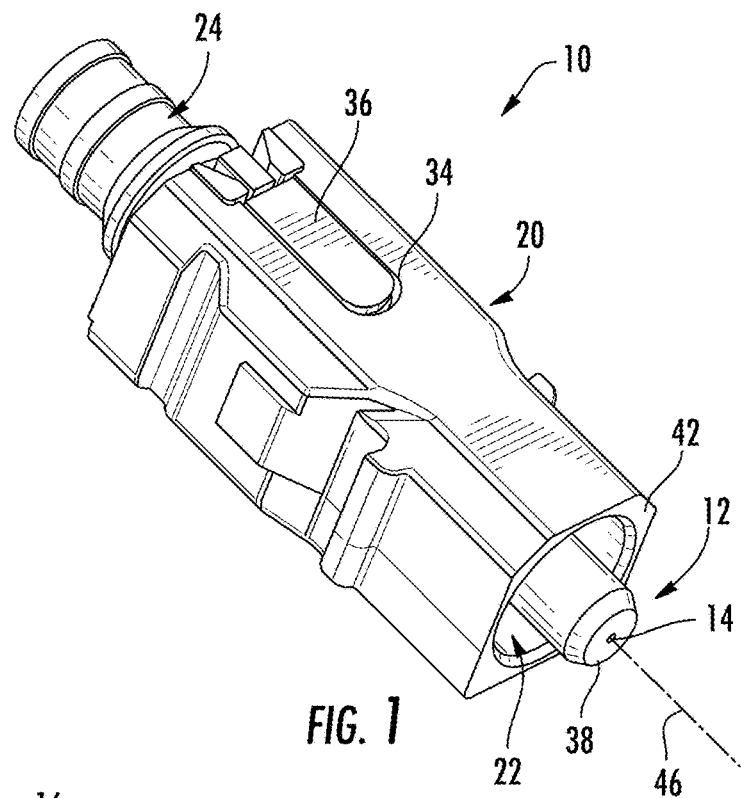
FIG. 1 is a perspective view of a fiber optic connector.

One example of a fiber optic connector (also referred to as "optical connector 10", or simply "connector 10") for such a cable assembly is shown in FIG. 1. Although the connector 10 is shown in the form of a SC-type connector (e.g., according to IEC 61754-4:2013), the methods described below may be applicable to processes involving different fiber optic connector designs. This includes LC, SN and MDC (according to the QSFP-DD Multi-Source Agreement (MSA) Hardware Specification, Rev. 6.0, 2021, and the relevant documents cross-referenced therein), and MPO-type connectors, for example, and other single-fiber or multi-fiber connector designs. A general overview of the connector 10 will be provided simply to facilitate discussion.

Figure 2:
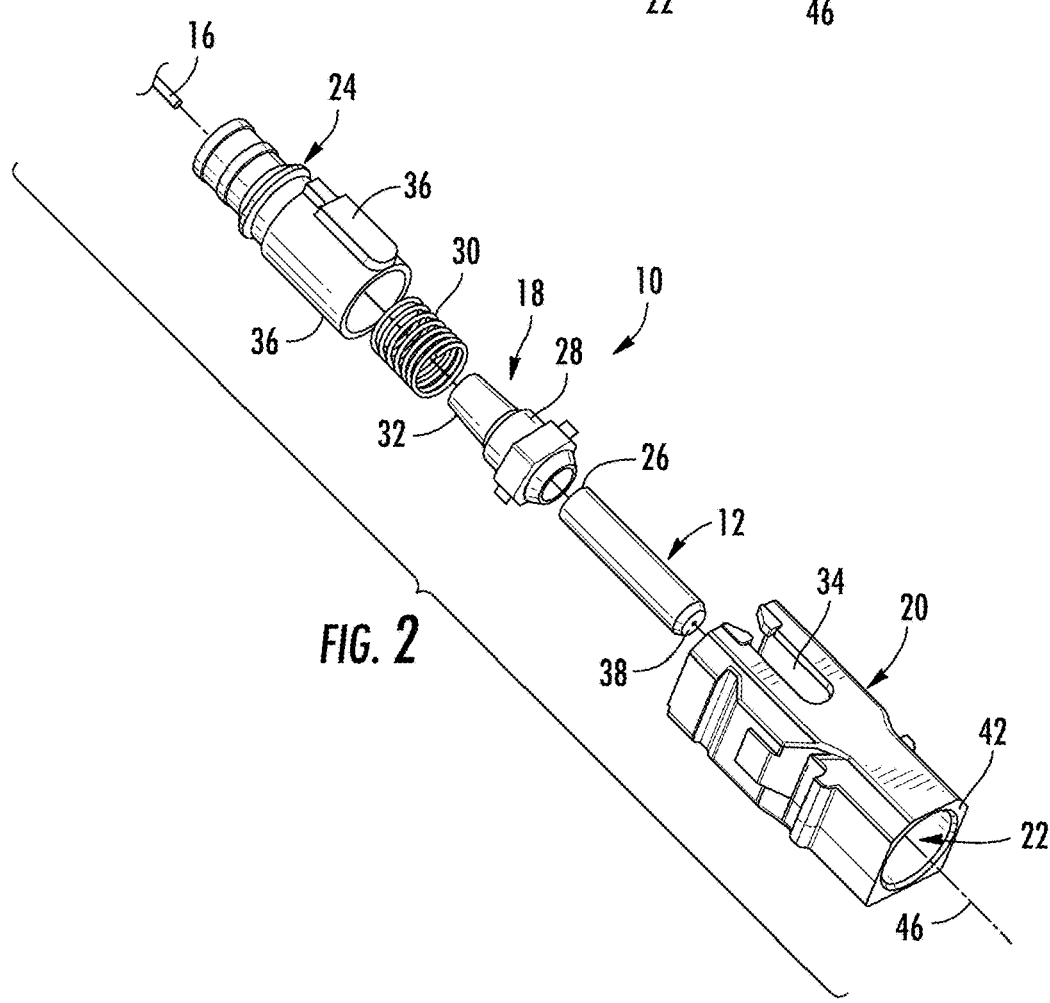
FIG. 2 is an exploded perspective view of the fiber optic connector shown in FIG. 1.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "retention body 24" or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments.

The ferrule holder 18 is biased to a forward position within the housing 20 by a spring 30, which extends over a second portion 32 of the ferrule holder 18 that has a reduced cross-sectional diameter/width compared to the first portion 28. The spring 30 also interacts with internal geometry of the connector body 24, which may be secured to the housing 20 using a snap-fit or the like. For example, FIGS. 1 and 2 illustrate a rear portion of the housing 20 having cut-outs or slots 34 on opposite sides so as to define a split shroud. The connector body 24 has tabs 36 configured to be snapped into the slots 34 and retained therein due to the geometries of the components.

When the connector 10 is assembled as shown in FIG. 1, a front end 38 of the ferrule 12 ("ferrule end face 40") projects beyond a front end 42 of the housing 20. The ferrule end face 40 presents the optical fiber 16 ("fiber end 44") for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 48 (hereinafter "cable 48") including the optical fiber 16 can be terminated with the connector 10. In other words, the connector 10 can be installed on the cable 48 to form a fiber optic cable assembly 50. The cable 48 is merely an example to facilitate discussion. In the embodiment shown, the fiber cable 48 includes an outer jacket 52, inner jacket 54, strength members 56 in the form of aramid yarn, and the optical fiber 16, which itself has a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 48 is merely an example, as persons skilled in optical connectivity will appreciate how different cable designs may be terminated with the connector 10.

Figure 3:
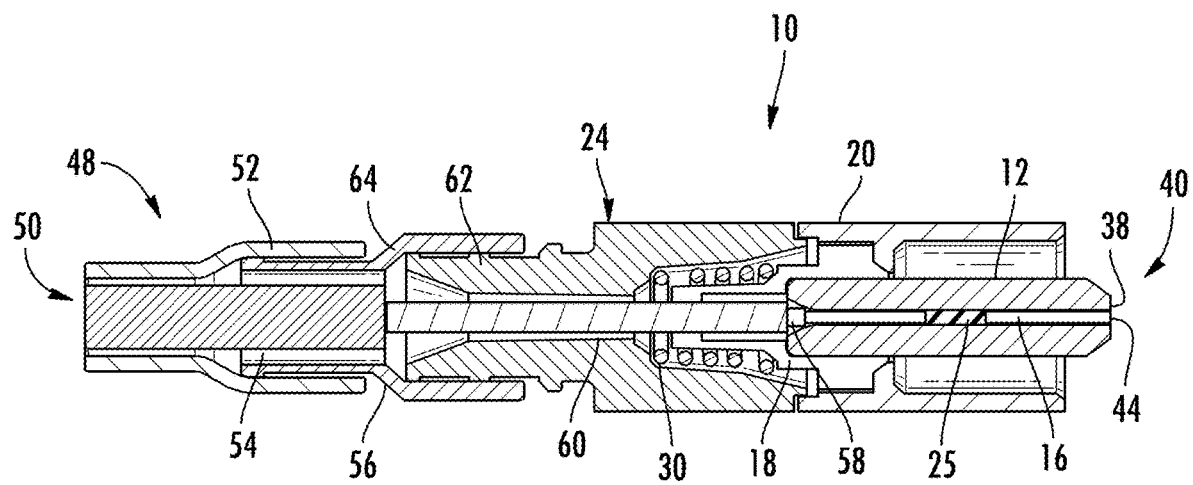
FIG. 3 is a cross-sectional view of the fiber optic connector of FIG. 1 installed on a fiber optic cable.
Figure 4:
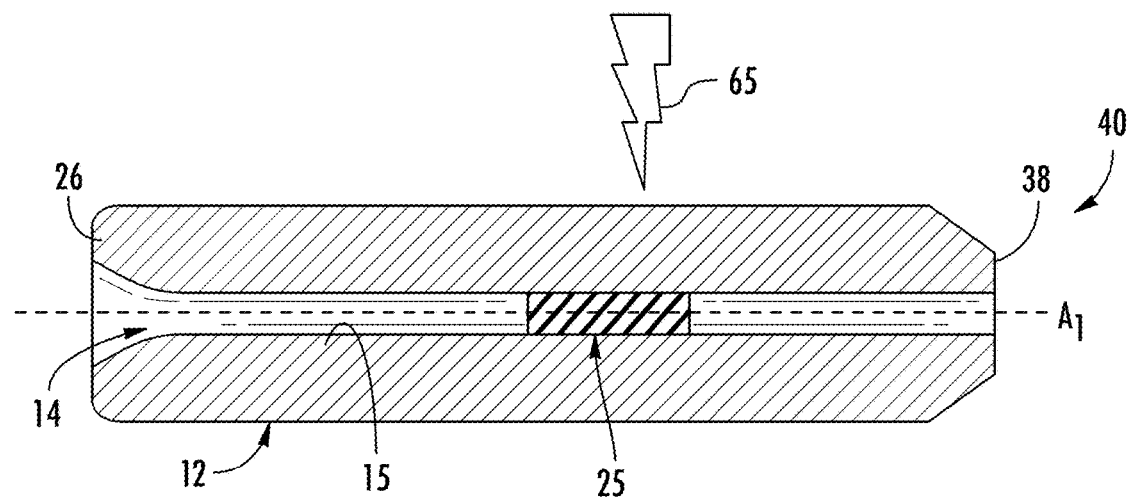
FIG. 4 is a cross-sectional view of a ferrule and a bonding agent disposed in a ferrule bore of the ferrule of the fiber optic connector shown in FIG. 1.

FIG. 3 illustrates the connector 10 in further detail, and FIG. 4 is an enlarged view of the ferrule 12 in isolation. As shown, ferrule 12 is a standard ferrule where ferrule bore 14 has a substantially consistent diameter throughout a length of ferrule 12. However, it is within the scope of the present disclosure that alternate ferrules may be used, such as a counterbore ferrule or a ferrule 12 having ferrule bore 14 with varying diameters throughout the length of ferrule 12, for example. In general, the ferrule 12 includes a ferrule bore 14 extending between the front and rear ends 14, 16 along a longitudinal axis A1. The front and rear ends 14, 16 define respective front and rear end faces of the ferrule 12 that extend in planes parallel or substantially parallel to each other but substantially perpendicular to the longitudinal axis A1. In some embodiments, the front end face may be at a slight angle relative to the longitudinal axis A1 to provide, for example, an angled physical contact (APC) end face.

Figure 5:
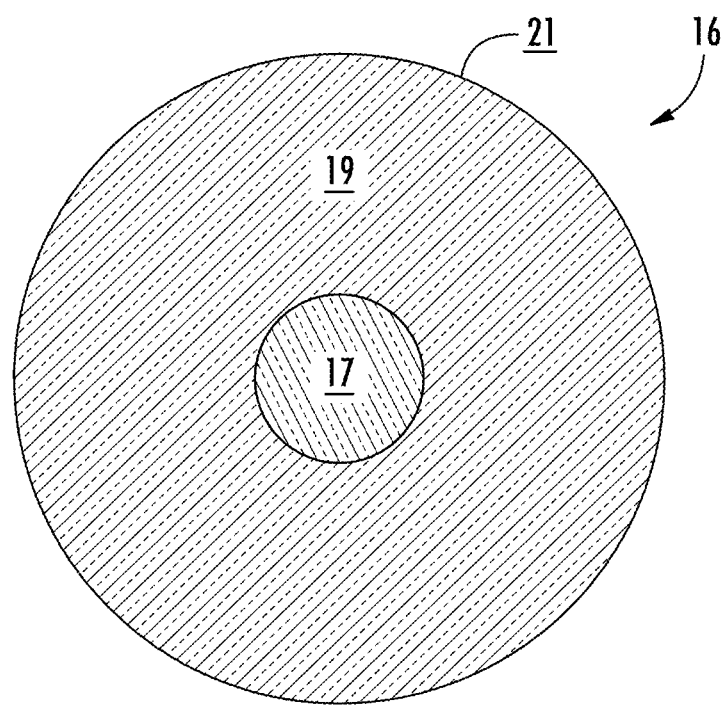
FIG. 5 is a cross-sectional view of an example optical fiber configured to be inserted into the ferrule of FIG. 4.

Ferrule 12 is intended to terminate an optical fiber 16, an example of which is shown in FIG. 5. Optical fiber 16 is configured to be inserted into ferrule 12 and optical fiber connector assembly 50 is shown. Optical fiber 16 includes a core 17 and a cladding 19 surrounding core 17 to define an external surface 21 of optical fiber 16. Core 17 and cladding 19 are composed of materials with an appropriate refractive index differential to provide desired optical characteristics. Cladding 19 includes all glass portions (e.g., silica glass) of an optical fiber 16 outside core 17 and is not limited to glass portions of optical fiber 16 outside of core 17 which are optically functional.

Part of terminating optical fiber 16 to form fiber optic cable assembly 50 includes disposing a bonding agent 25 in ferrule bore 14, an example of which is shown in FIGS. 3 and 4. As shown, bonding agent 25 may be seated or pre-loaded within ferrule bore 14 in a solid form and is in contact with inner wall 15 of ferrule bore 14. In an alternate embodiment, as discussed in greater detail herein, bonding agent 25 may be injected into ferrule bore 14 in a liquid form.

Figure 6A:
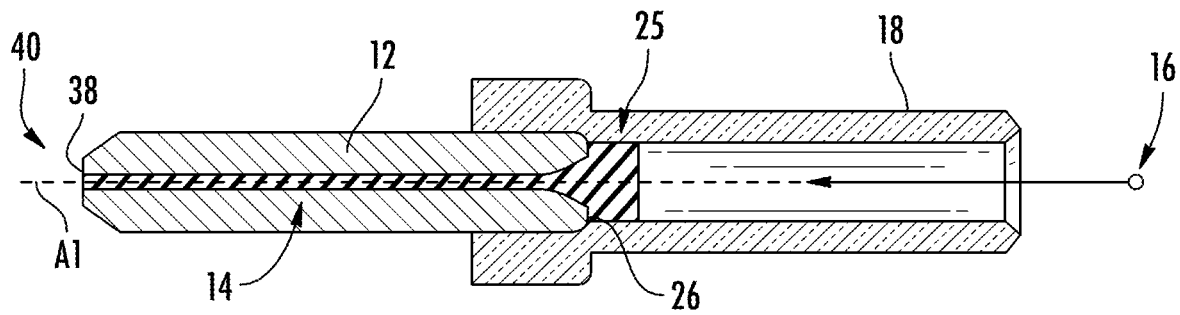
FIGS. 6A-6C are cross-sectional views of the ferrule and a ferrule holder with an optical fiber illustrating the locations of a bonding agent.
Figure 6B:
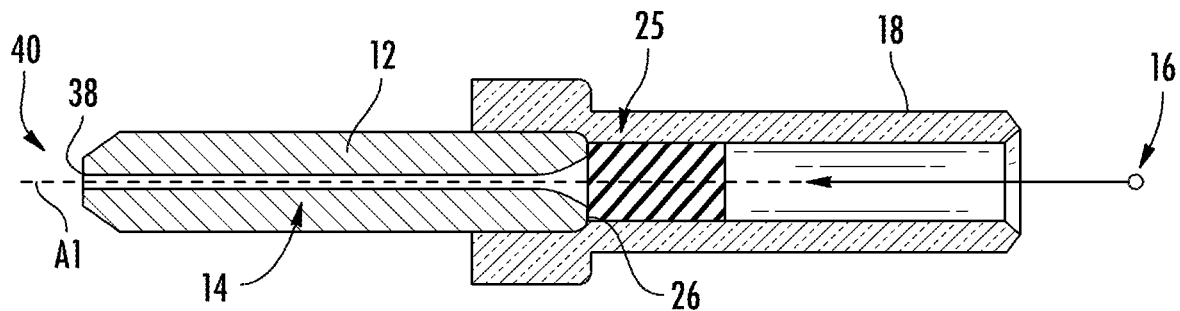
Figure 6C:
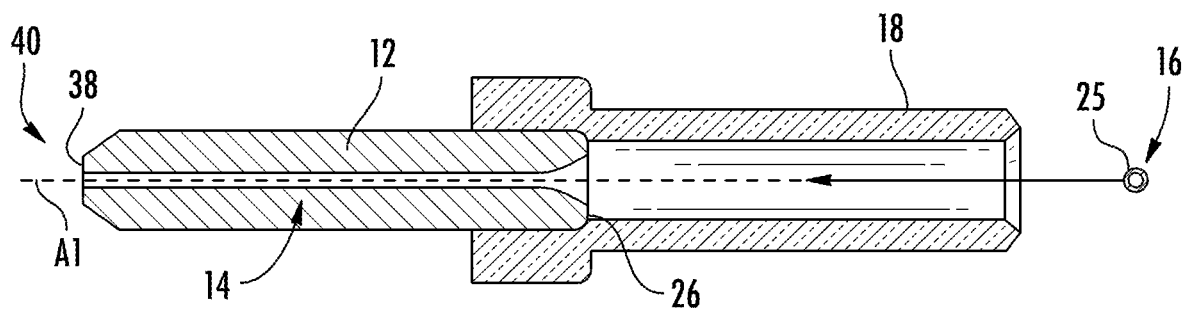

Referring briefly to FIGS. 6A-6C, various examples of disposing bonding agent 25 in ferrule 12 and/or ferrule holder 18 are shown. Referring first to FIG. 6A, bonding agent 25 is injected into ferrule bore 14 through ferrule holder 18. As shown, bonding agent 25 is seated substantially throughout the length of ferrule bore 14 with a portion of bonding agent 25 seated beyond rear end 16 of ferrule 12. When optical fiber 16 is inserted into ferrule holder 18 and ferrule 12, optical fiber 16 is inserted through ferrule holder 18, ferrule 12, and bonding agent 25. In another embodiment, with reference to FIG. 6B, bonding agent 25 is injected through ferrule holder 18 with bonding agent 25 seated beyond rear end 16 of ferrule 12. In this embodiment, optical fiber 16 is inserted through ferrule holder 18, through bonding agent 25, and into ferrule bore 14 with bonding agent 25 on external surface 21 of optical fiber 16. In another embodiment, bonding agent 25 is inserted into ferrule holder 18 where optical fiber 16 is inserted into ferrule holder 18 and ferrule 12 with bonding agent 25 on external surface 21 of optical fiber 16 as shown in FIG. 6C.

Bonding agent 25 is configured to couple an optical fiber 16 within ferrule 12 to form a connector assembly 50. In some embodiments, bonding agent 25 comprises an anaerobic adhesive. An example anaerobic adhesive includes Loctite 648 manufactured by Henkel AG & Co. KGaA. An advantage of using an anaerobic adhesive is that when uncured, bonding agent 25 is a low viscosity liquid that can be injected into ferrule bore 14. In some embodiments, bonding agent 25 has a viscosity ranging between 50 cP and 7000 cP, between 100 cP and 5000 cP, or between 100 cP and 1000 cP at room temperature (about 25° C.). In some embodiments, bonding agent 25 (after full curing) has a glass transition temperature above 70° C., above 80° C., or above 100° C.

Bonding agent 25 can cure in different ways. At room temperature, bonding agent 25 cures in about 24 hours. Curing time can be accelerated by using a primer with bonding agent 25 as discussed in greater detail below. For example, bonding agent 25 can cure in between less than 1 minute to 5 minutes by using a primer. Curing time can be further accelerated by increasing the temperature (i.e., adding heat) under which bonding agent 25 cures. For example, in some embodiments, bonding agent 25 can cure in between 1 minute and 5 minutes at a curing temperature of 150° C. or above. In particular, in some embodiments, curing bonding agent 25 comprises heating bonding agent 25 to a curing temperature of at least about 150° C. for a curing time of less than 10 seconds and by cooling bonding agent 25 to room temperature (about 25° C.) or below in less than about 1 minute. In some embodiments, heat is applied to a front portion of ferrule 12 to cure bonding agent 25 that is positioned at the front portion of ferrule 12 (front portion extends from front end 14 towards rear end 16). This enables polishing of an end face optical fiber 16 without optical fiber 16 changing position within ferrule 12. The remainder of bonding agent 25 is cured at room temperature (about 25° C.). In some embodiments, a front portion of ferrule 12 comprises a length of at least 2 mm extending from a front end 14 of ferrule 12. In some embodiments, a front portion of ferrule 12 comprises a length of about 5 mm extending from a front end 14 of ferrule 12. In other embodiments, front portion of ferrule 12 comprises a percentage of a total length of ferrule bore 14 that spans at least 20% of the total length of ferrule bore 14. In some embodiments, bonding agent 25 has a curing time of 10 seconds. In some embodiments, bonding agent 25 has a curing time of 5 seconds.

In some embodiments, bonding agent 25 interacts with a primer that is configured to accelerate curing of bonding agent 25 as discussed herein. In some embodiments, the primer includes metal ions, such as organo-copper compounds or one or more organo-solvents. In some embodiments, the primers that may be used include SF 7471, SF 7649, SF 7091 manufactured by Henkel AG & Co. KGaA. However, it is within the scope of the present disclosure that alternate primers may be used. In embodiments where a primer is used, bonding agent 25 is first injected into ferrule holder 18 as discussed above, and then the primer is then applied onto external surface 21 of optical fiber 16 prior to insertion of optical fiber 16 into ferrule holder 18 and ferrule 12.

Figure 7:
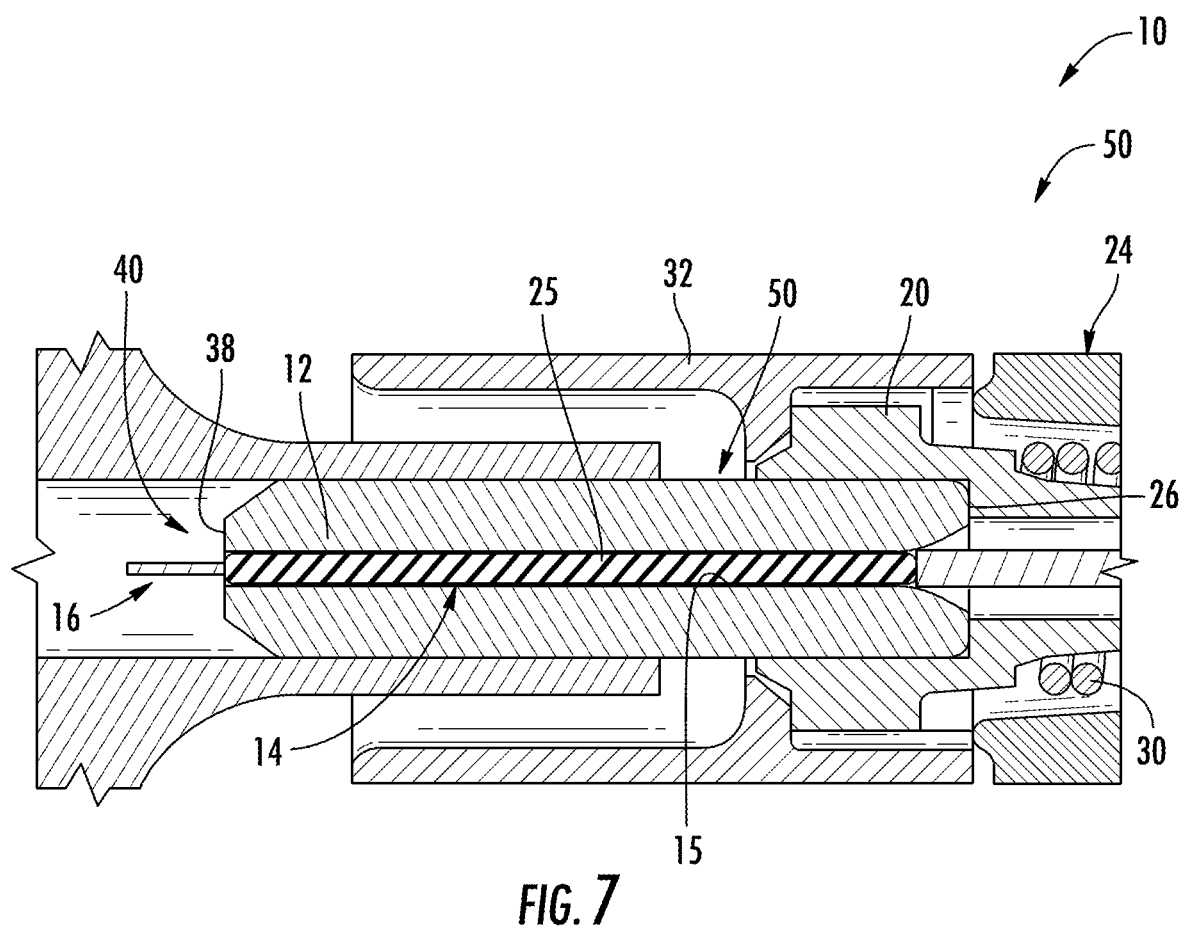
FIG. 7 is a cross-sectional view of a fiber optic connector assembly.

As shown in FIG. 7, an optical fiber 16 is inserted into ferrule 12 to form optical fiber connector assembly 50. In some embodiments, optical fiber connector assembly 50 has a mean insertion loss of less than or equal to 0.25 dB, between 0.12 dB and 0.25 dB, or less than or equal to 0.12 dB at a reference wavelength of 1310 nm as measured according to IEC61753-1. In some embodiments, optical fiber connector assembly 50 has a maximum insertion loss for 97% of samples tested of less than or equal to 0.50 dB, between 0.25 dB and 0.50 dB, or less than or equal to 0.25 dB at a reference wavelength of 1310 nm as measured according to IEC61753-1. In some embodiments, optical fiber connector assembly 50 has a fiber retention or pull out force of at least 10 N.

Figure 8:
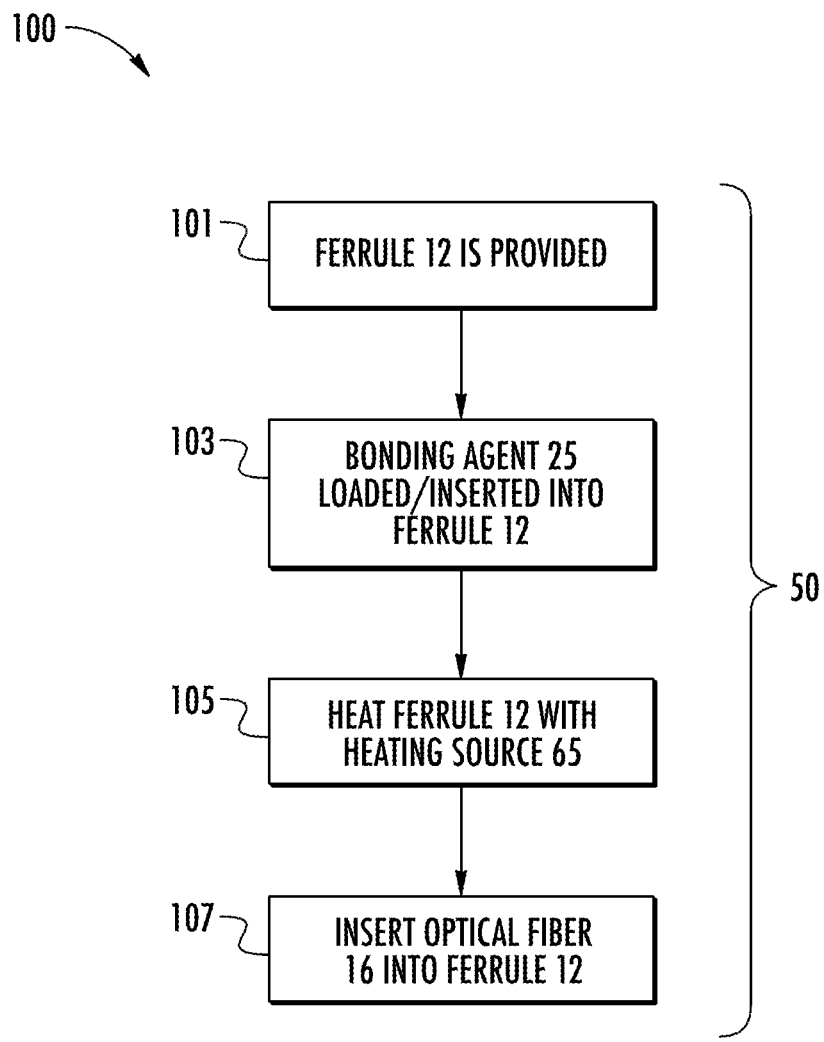
FIG. 8 is a flowchart illustrating a method of assembling a fiber optic connector assembly.

To assemble an optical fiber connector assembly 50, a method 100 is shown in FIG. 8. Method 100 begins at step 101 where a ferrule 12 is provided. Then, a bonding agent 25 is loaded/inserted into ferrule 12 at step 103 as discussed above with reference to FIGS. 6A-6C. Then, at step 105, ferrule 12 is heated by a heat source 65 (FIG. 4) to a curing temperature of at least about 150° C. to cure bonding agent 25 with a curing time of between 5 seconds and 10 seconds. In some embodiments, heat source 65 is heated by laser heating. In other embodiments, alternate heating methods may be used for heat source 65 such as thermoelectric heating or induction heating, for example. Optical fiber 16 is then inserted into ferrule bore 14 of ferrule 12 at step 107. In some embodiments, steps 105 and 107 can be performed simultaneously. That is, optical fiber 16 can be inserted into ferrule 12, and at the same time, ferrule 12 can be heated to cure bonding agent 25. Simultaneous execution of steps 105 and 107 can reduce cycle time of method 100. In other embodiments, optical fiber 16 is inserted, and then optical fiber 16 and ferrule 12 are heated according to methods described above.

EXAMPLES

Fiber Adhesion

Sample optical fiber connector assemblies were prepared using method 100 described herein where ferrule 12 was heated so that bonding agent 25 can be cured instantly to bond optical fiber 16 to ferrule 12. Ferrule 12 was heated by an electrothermal heating station. Ferrule 12 was preloaded with bonding agent 25, and ferrule 12 and injected bonding agent 25 were placed on the heater at various curing temperatures ranging between 100° C. to 280° C., and optical fiber 16 was inserted after 5 seconds of heating and then the assembly was cured for another 5 seconds after which connector assembly 50 was removed from the heating station. After removal from the heating station, optical fiber 16 was pulled using a force gauge and associated apparatus to assess the bonding strength of bonding agent 25.

When the curing temperature was set to 280° C., optical fiber 16 began to break during insertion indicating bonding agent 25 is cured prior to insertion of optical fiber 16 after 5 seconds.

At curing temperatures between 150° C. and 220° C., there was good bonding between optical fiber 16 and bonding agent 25 with a fiber retention or pull-out force of at least 10 N (about 2.25 lbf).

Insertion Loss

Insertion loss and data of optical fiber connector assemblies 50 as prepared by method 100 was measured in accordance with IEC61753-1. The mean insertion loss of the samples was less than or equal to 0.25 dB, and the maximum insertion loss of the samples was less than or equal to 0.50 dB.

Insertion loss change after temperature/thermal cycling (from −25° C. to 70° C.) for samples prepared in accordance to method 100 described herein with a 200° C. curing temperature is shown. As shown, the mean change in insertion loss after thermal cycling was less than or equal to 0.2 dB, which also meets IEC 61753.

Fiber Pull-Out or Retention Force

Optical fiber pull-out force was measured by using a force gauge and associated apparatus to impart opposite axial forces on the optical fiber and the ferrule. The pull-out test procedure generates data relating to the maximum force, the force when the optical fiber stub protruding from the front of the ferrule begins to move, and the failure mode. There are five failure modes: break, slip, pull, slip break, and no fiber stub. If the failure mode was a break, the location of the break was measured relative to the edge of the coating and recorded.

Fiber pull-out testing was performed on 10 samples. The pull-out force along with the failure modes were recorded for both pre and post thermal cycling (from −25° C. and 70° C. or from −10° C. to 60° C.) according to IEC 61753 as shown in Table 1 below. As shown in Table 1, there is a degradation in optical fiber to ferrule adherence when a sample was subjected to thermal cycling. Table 1 also shows how the dominate failure mode shifts (from "Slip" or "Pull" to "Break") different modes after connector assembly 50 has been exposed to high temperature and humidity.

TABLE 1

| Pre-Chamber Treatment (Pre-Thermal Cycling) | | Post Chamber Treatment (Post Thermal Cycling) | |
| --- | --- | --- | --- |
| Average Pull Out Force (lbf) | Failure Mode | Average Pull Out Force (lbf) | Failure Mode |
| 6.4 | Break | 2.0 | Break |
| 5.4 | Break | 3.39 | Break |
| 3.8 | Break | 4.83 | Break |
| 3.9 | Break | 2.95 | Break |
| 2.9 | Break | 4.13 | Break |
| 6.8 | Break | 5.07 | Slip |
| 2.5 | Slip | 8.56 | Break |
| 6.6 | Break | 4.21 | Break |
| 4.9 | Break | 3.52 | Break |
| 3.6 | Break | 4.17 | Break |

As shown in Table 1, fiber pull-out force averaged to about 4.5 pounds force (lbf) before and after thermal aging (temperature cycling from −25° C. to 75° C. or from −10° C. to 60° C.) thereby passing IEC specification—IEC 61753.

Fiber Movement

Sample optical fiber connector assemblies 50 as prepared by method 100 outlined above were selected for fiber movement testing before and after thermal cycling. The samples were loaded into a thermal and humidity controlled chamber where the samples were thermally cycled as discussed above. Various samples underwent different thermal cycling or curing conditions. One group of samples were cured at 100° C. for 10 seconds, another group of were cured at 150° C. for 10 seconds, another group of samples were cured at 240° C. for 10 seconds, and another group of samples were cured under ambient conditions (about 25° C.).

As used herein, "fiber movement" refers to the measured position change of an end of the optical fiber 16 relative to front end 14 of ferrule 12 before and after thermal cycling (temperature cycling from −25° C. to 75° C. or from −10° C. to 60° C.). The delta movement of the sample optical fibers 16 within connectors using bonding agent 25 among all groups was less than 300 nm.

Persons skilled in optical connectivity will appreciate additional variations and modifications of the elements disclosed herein. Such persons will also appreciate variations and modifications of the methods involving the elements disclosed herein. For example, although embodiments are described above where less than all of the bonding agent is melted and solidified when forming a fiber optic connector sub-assembly, in alternative embodiments all or substantially all of the bonding agent may be melted and solidified. In addition, skilled persons will appreciate alternatives where some of the steps described above are performed in different orders. To this end, where a method claim below does not actually recite an order to be followed by its steps or it is not otherwise specifically stated in the claims below or description above that the steps are to be limited to a specific order, it is no way intended that any particular order be inferred.

What is claimed is:

1. A method of assembling an optical fiber assembly, wherein the optical fiber assembly includes a ferrule having a front end, a rear end, and a ferrule bore extending between the front and rear ends, the method comprising:
    disposing a bonding agent into the ferrule;
        wherein the bonding agent comprises an anaerobic adhesive;
        wherein the bonding agent has a viscosity ranging between 50 cP and 7000 CP;
    heating a front portion of the ferrule to at least 150° C. while the bonding agent is in the ferrule bore;
    inserting an optical fiber into the ferrule bore;
        wherein the heating step causes the bonding agent that is in the front portion of the ferrule to cure in less than 1 minute and thereby secure the optical fiber to the front portion of the ferrule.

2. The method of claim 1, wherein the bonding agent has a viscosity between 100 cP and 5000 cP.

3. The method of claim 1, wherein the inserting step is simultaneous with the heating step.

4. The method of claim 1, wherein the inserting step is completed before the heating step.

5. The method of claim 1, wherein the heating step is completed in less than 10 seconds.

6. The method claim 1, wherein the disposing step comprises preloading the bonding agent into the ferrule bore prior to the heating and the inserting steps.

7. The method of claim 1, wherein the ferrule is part of a ferrule assembly that includes a ferrule holder receiving a rear portion of the ferrule, and wherein the disposing step comprises preloading the bonding agent in the ferrule holder adjacent the rear end of the ferrule.

8. The method of claim 1, further comprising: applying the bonding agent onto an external surface of the optical fiber, wherein the disposing step occurs when the optical fiber with the bonding agent applied to the external surface is inserted into the ferrule bore.

9. The method of claim 1, wherein the bonding agent has a glass transition temperature above 70° C.

10. The method of claim 1, wherein the optical fiber has a pull force of at least 10 N.

11. The method of claim 1, wherein the front portion of the ferrule comprises a length that is at least 20% of a total length of the ferrule bore.

12. The method of claim 1, wherein during at least the heating step the ferrule is part of an optical connector assembly that includes a connector housing in which a rear portion of the ferrule is positioned, and wherein the front portion of the ferrule extends out of the connector housing.

* * * * *